United States Patent [19]

Risler et al.

[11] 4,154,864
[45] May 15, 1979

[54] EXTRACTS OF VEGETABLE MATERIALS

[75] Inventors: Pierre Risler, Montmorency; Jean Gireau, Montrouge; Pierre Rosé, Ennery; Jean-Pierre Bisson, Boulogne-Billancourt, all of France

[73] Assignee: Societe d'Assistance Technique Pour Produits Nestle S.A., Lausanne, Switzerland

[21] Appl. No.: 891,560

[22] Filed: Mar. 30, 1978

Related U.S. Application Data

[63] Continuation-in-part of Ser. No. 635,590, Nov. 28, 1975, abandoned.

[30] Foreign Application Priority Data

Dec. 17, 1974 [FR] France ................................ 74 41602

[51] Int. Cl.² ............................................. A23G 3/00
[52] U.S. Cl. .................................... 426/594; 426/599; 426/597; 426/448

[58] Field of Search ............... 426/594, 597, 598, 599, 426/515, 516, 517, 445, 447, 448, 596

[56] References Cited

U.S. PATENT DOCUMENTS

| 1,123,828 | 1/1915 | Whitaker | 426/594 |
| 3,650,769 | 3/1972 | Fritzberg | 426/594 |
| 3,666,484 | 5/1972 | Gurkin et al. | 426/597 |

Primary Examiner—Frank Sever
Attorney, Agent, or Firm—Watson, Leavenworth, Kelton & Taggart

[57] ABSTRACT

A vegetable extract in the form of grains which dissolve instantaneously in water and which have a porous, continuous structure, a smooth surface and an apparent density of from 50 to 300 g/l.

A process for the production of a vegetable extract as described above, which comprises extruding a vegetable extract in powder or paste form into a chamber where a subatmospheric pressure prevails, and cutting the extruded product into fragments.

17 Claims, 4 Drawing Figures

EXTRACTS OF VEGETABLE MATERIALS

This application is a continuation-in-part of Application Ser. No. 635,590, filed Nov. 28, 1975, now abandoned.

This invention relates to vegetable extracts, more especially extracts of coffee, chicory or other coffee substitutes, tea, herbal decoctions, etc., and a process for producing such extracts.

Coffee extracts for example are generally in the form of dry powder of which the constituent particles are relatively small in the case of spray-dried products. In the case of agglomerated or freeze-dried products, with which it is desired to simulate roasted and ground coffee, the constituent particles are larger, but irregular.

An object of the present invention is to provide a new industrial product consisting of a water-soluble grain which comprises dehydrated extract of vegetable material selected from the group consisting of coffee, chicory, tea and herbal decoction, said grain having (a) a porous, cellular internal structure encompassed by an essentially smooth surface skin, (b) an apparent density of from 50 to 300 g/l, and (c) a moisture content of up to 6%.

The invention also relates to a process for producing these water-soluble grains which comprises pressure extruding a thermoplastic vegetable material extract selected from the group consisting of coffee, chicory, tea and herbal decoction having a moisture content of up to 10% by dry weight at a temperature in the range from about 60° to 125° C. and under a pressure of from about 1 to 10 atmospheres into a chamber where a subatmospheric pressure of from 0.01 to 0.3 atmosphere prevails, and then cutting the extruded product into fragments.

The extracts with which the invention is concerned are essentially extracts of coffee, chicory or other coffee substitutes, tea and herbal decoctions, for example mint, lime blossom, vervain, camomile, etc.

The accompanying drawing shows one exemplary embodiment of the product according to the invention.

The grains according to the invention have the property of dissolving practically instantly in water. They dissolve instantaneously in hot water. In addition and unexpectedly, they dissolve substantially immediately in cold water.

Figure 1:
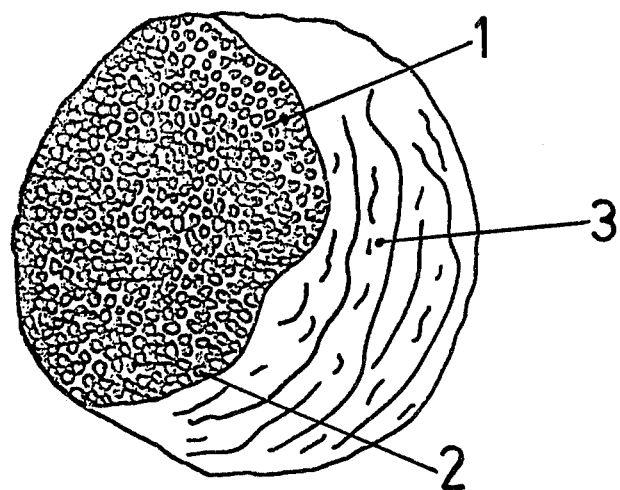
FIG. 1 is a diagrammatic section through a grain according to the invention 6 mm in diameter enlarged 12.8 times.
Figure 3:
FIG. 3 is a photomicrograph of a grain made in accordance with the process of the present invention which has been cut to show its interior. The grain, as can be seen, has a porous, cellular internal structure and a substantially smooth surface skin.
Figure 4:
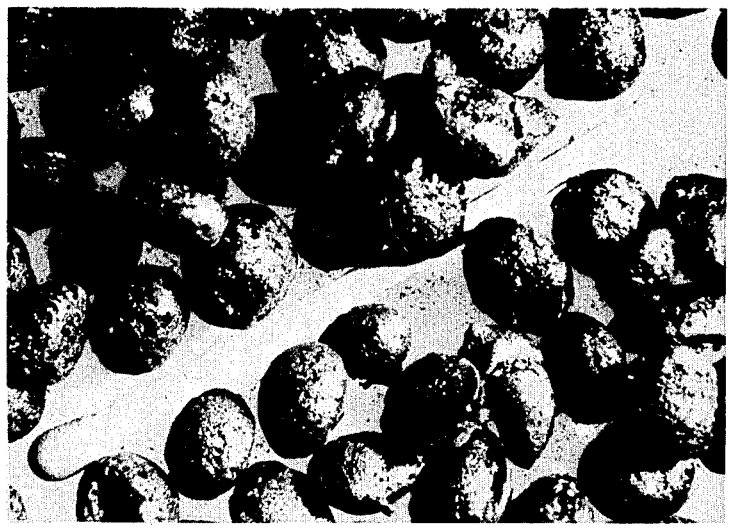
FIG. 4 is a photomicrograph of the grains made in accordance with the process of the present invention wherein their size is shown relative to a standard match stick.

As shown in the drawing (FIG. 1) and the photomicrograph of FIG. 3, the grains according to the invention have a porous, cellular internal structure 1. This structure is fairly regular and may be compared with a structure of the sponge type. The average size of the cells 2 is variable within wide limits, depending upon the production conditions, amounting for example to between a few 1/100 mm and 1 mm. By virtue of their generally homogeneous structure, coupled with the absence of any significant irregularity other than accidental, the grains according to the invention differ radically from the granules obtained by the agglomeration of finer particles.

The external appearance of the grains according to the invention differs from their internal appearance. They have a surface 3 which, accidents apart, is relatively smooth without any roughness, the pitting effect attributable to the open cells around the outside of the grains being limited in the extreme. In other words, the grains have a skin in the form of a very thin, fine porous film.

In short, the appearance of these grains bears a striking resemblance to that of pumice stone.

The apparent density of the grains, amounting to between 50 to 300 g/l, invites little comment. It is a direct consequence of the porous, cellular structure and may be predetermined by carefully selecting the production conditions.

The shape and size of the grains may also be predetermined in dependence upon the production conditions. In practice, the minimal dimensions in which the grains can be produced without any major difficulties are of the order of 1 to 1.5 mm, in other words the grains are retained by a 1 mm mesh screen (U.S. Standard No. 18). The grains are preferably produced in sizes of from 2.5 to 15 mm.

Figure 2:
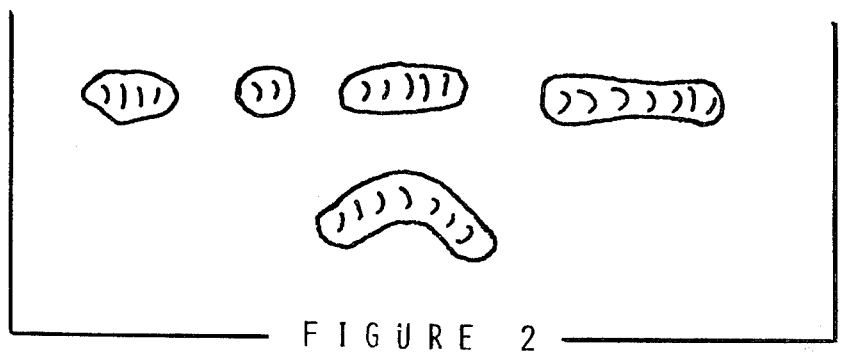
FIG. 2 illustrates grains according to the invention.

The grains obtained by a process where only a single nozzle (or several identical nozzles or even a multiple nozzle with identical orifices) is used and where the extruded product is cut in a regular sequence, are all substantially identical in shape and size without any oversize or undersize grains. A few possible grain forms are illustrated by way of example in FIG. 2. By simultaneously using several different nozzles or by selecting an irregular cutting sequence, it is of course readily possible to obtain an end product consisting of grains differing from one another in shape and size. This result may also be obtained by mixing the end product from a first production cycle with the end product of another production cycle.

In general, the grains are relatively hard and show good resistance to crushing. For example, a whole grain based on a soluble coffee extract, generally spherical in shape with a diameter of 6 mm, has a resistance to crushing of the order of 2.5 to 7.5 Newtons. By comparison, a soluble coffee consisting of grains is distinctly less friable than a freeze-dried or agglomerated coffee powder with the same apparent density.

The grain-form vegetable extracts according to the invention, of which the moisture content may amount to as much as 6% of their dry weight, additionally have a very high absorption capacity. They are capable of absorbing up to 20% of their own weight of fats, aromas, colorants, etc. In practice, a fat content of 5% should not be exceeded in order to avoid the formation of globules of fat in the reconstituted beverage. In spite of their absorption capacity, the grains may be regarded as substantially non-hygroscopic insofar as they can be exposed for several days to atmospheric humidity without becoming tacky.

A process for producing these grains comprises pressure extruding a thermoplastic vegetable material extract selected from the group consisting of coffee, chicory, tea and herbal decoction having a moisture content of up to 10% by dry weight at a temperature in the range from about 60° to 125° C. and under a pressure of from about 1 to 10 atmospheres into a chamber where a subatmospheric pressure of from 0.01 to 0.03 atmosphere prevails, and then cutting the extruded product into fragments.

Naturally, the vegetable extract should lend itself to extrusion, in other words it should be thermoplastic or should contain a high proportion of thermoplastic constituents. The notion of thermoplasticity, which implies softening under the effect of heat, and optionally pressure, and hardening on cooling, is easily realized in the case of a paste. In the case of a powder, this notion signifies that the constituent particles of the powder are capable, under the effect of heat, and optionally pressure of melting into one another to from a soft, more or less malleable mass.

The water content of the extract (in the form of a powder or paste) is an important factor, but it not critical insofar as it may vary within a wide range, amounting to as much as 10%, based on the dry weight of the grain. It has a direct influence upon the characteristics of the end product and, to prepare a given end product, it may be necessary to modify the water content of the initial extract.

The temperature of the extract in the extruder is obviously an essential factor of the process according to the invention because it is this temperature which ensures the plasticity of the extract and enables it to pass suitably through the extrusion nozzles. It should be high enough to ensure this plasticity, namely of the order of 60° C., but should not cause any deterioration of the treated extract. A temperature of 125° C. may be regarded as an upper limit which it is best not to exceed. It is advisable to take particular precautions to prevent the temperature of the nozzles themselves or at the nozzles from exceeding this limit under the effect of the compression forces acting upstream of the nozzles, the compression level normally amounting to between 1 and 10 bars (approximately equal to 1 to 10 atmospheres) in regular operation.

The diameter of small orifices, which partly determines the pressure level in the extruder, may be selected with a considerable degree of freedom in dependence upon the dimensions which the end product is intended to have. However, extrusion is difficult to carry out in a practical manner if the orifices have dimensions of less than 25/100 mm. Nozzle diameters of the order of 0.5 to 5 mm may be considered as optimum values for the production of coffee extract grains from powder-form extracts with a moisture content of from 2 to 6%. The shape of the nozzles is of minor importance insofar as the results obtained with short or long nozzles, conical nozzles or even two-piece nozzles (the one narrow, the other wider) are not significantly better than those obtained with conventional cylindrical nozzles. In order to provide the end product with a particular shape, it is of course possible to use nozzles of non-circular cross-section, for example nozzles of square, oval or even cloverleaf cross-section, etc. In addition, the surface finish of the extruded product, i.e. of the grains obtained, may be influenced by using refrigerated nozzles or nozzles of which the outer part is refrigerated.

On the other hand, the sub-atmospheric pressure or vacuum prevailing in the chamber downstream of the nozzles is a critical factor. In the absence of this vacuum, the product obtained by extruding an extract heated to fairly moderate temperatures for operations of this kind would not be able to acquire the expanded texture required. By contrast, the reduced pressure downstream of the nozzles causes, on the one hand, a sudden elimination of at least part of the water in the from of steam and of the gases initially present in the extract and, on the other hand and correlatively, a sudden reduction in temperature, leaving the extruded product with the required texture and rigidity. In practice, the sub-atmospheric pressure is of the order of 0.01 to 0.3 bar (approximately equal to 0.01 to 0.3 atmosphere).

In one embodiment of the process according to the invention, the starting extract, in powder or paste form, is introduced by delivery means of any kind, at atmospheric pressure, under pressure or in vacuo and, if necessary, under an inert gas, into an extruder of which the barrel is at a temperature of from 60° to 100° C. This extract is then conveyed towards the extrusion nozzle(s) by such means as a piston (batch operation) or a single or double screw (continuous operation), with a fixed or variable pitch and optionally heated, and gradually plasticises under the effect of the heat and the pressure applied. The hot extract then passes through the extrusion nozzles kept at a temperature between 70° and 90° C. and arrives in the chamber where the vacuum prevails, also referred to as the expansion chamber. Under the effect of the sudden decompression, part of the water (up to 50%) and of the gases present in this hot extract is expelled, whilst the temperature of the hot extract falls by several tens of degrees. An expanded product in the form of a porous, relatively rigid strand is thus obtained.

In a first variant, the strand is left to expand to completion and is then cut in a regular sequence, for example by means of a rotary blade. The grains obtained with uniform dimensions resemble pellets or "slices" in appearance.

In a second, preferred variant, the strand is cut before having completed its expansion, i.e. very close to the extrusion nozzles and in vacuo. The pellets obtained continue to expand, ultimately giving spheroidal or ovoidal grains of comparable size.

In a third variant, the pellets obtained by cutting the strand as it issues from the nozzles are collected in individual moulds in which they expand, thus assuming the shape of the mould, for example the shape of a coffee bean.

As already mentioned, application of the vacuum enables the starting extract to be textured without any need to heat it to a high temperature. As a result, the delicate substances in the extract, especially the aromatic substances, are largely preserved. Accordingly, the grains obtained have taste and aroma qualities comparable with those of the non-extruded starting extract. In addition, by virtue of their porous structure, they are able to absorb large quantities of various substances, for example fats, aromas, etc. Accordingly, it is possible if desired to spray onto these grains aromatic substances diluted in a suitable vehicle. They may of course also be after-treated, for example after-dried.

In one preferred embodiment of the process according to the invention, the thermoplastic extract used is a so-called instant beverage powder (coffee, tea, chicory, coffee plus chicory, etc.) obtained by spray-drying, freeze-drying or any other drying process. Its granulometry is of minor importance. If necessary, the water content of this powder is adjusted to between 2 to 6%, after which it is introduced into a screw extruder heated to 80°-100° C. and equipped with nozzles from 0.5 to 5 mm in diameter. The pressure in the expansion chamber amounts to between 0.05 and 0.15 bar (approximately equal to 0.05 to 0.15 atmosphere).

In one advantageous form of this preferred embodiment, the extruder is linked to a simple drying tower (i.e. a drying tower which is not equipped with means for recycling the fines) and is directly fed with the powder issuing from that tower.

The expanded strand is cut in vacuo immediately on issuing from the extrusion nozzles. The grains obtained then drop onto a tray and, having completed their expansion, may be carried outside the expansion chamber by means of an airlock. These grains generally have an apparent density of from 100 to 200 g/l in the case of coffee and coffee/chicory mixtures, and from 80 to 150 g/l in the case of tea. Depending on whether the starting powder was a de-aromatised powder or a normal powder, the grains obtained are aromatised or, if desired, their aroma is strengthened. To this end, it is possible for example to spray onto the grains based on coffee extracts a dispersion of aromatic coffee constituents in coffee oil or even to break the vacuum in the expansion chamber where the grains are situated by means of an atmosphere charged with aromatic coffee constituents, more especially a carbon dioxide atmosphere.

EXAMPLES

Equipment used:
1 feed hopper (BUSS RT 46) with a capacity of 10 liters.
1 extruder (BUSS ASV 46) with a theoretical output of 20 kg/h having a steam-jacketed barrel and a fixed-pitch screw 42 mm in diameter and 21 cm long with a compression ratio equal to 1.
1 expansion chamber with a capacity of 80 liters equipped with 1 liquid ring pump (SIHI).
1 condenser
1 rotary blade
1 refrigerable, vibrating tray
1 discharge air-lock This equipment was used in all of the following Examples.

EXAMPLE 1

10 kg of a freeze-dried instant coffee powder with a moisture content of 2.5% are extruded using the equipment described above, the extruder being equipped with 4 cylindrical extrusion nozzles 2.9 mm in diameter.
The operating parameters are as follows:
temperature of extruder barrel: 95° C.
screw speed: 80 rpm
rotational speed of cutting blade: 240 rpm
pressure in the extrusion chamber: 80 mb
the grains are collected on a vibrating tray refrigerated with liquid notrogen before operation.

Approximately 9.8 kg of coffee extract grains having the size of a small pea, an attractive brown colour and an apparent density of 160 g/l are thus obtained. These grains dissolve almost instantaneously in cold water. A reconstituted instant coffee is prepared by dissolving these grains in hot water in a quantity of approximately 15 g per liter. According to a taste testing panel, this reconstituted coffee has lost none of its organoleptic qualities by comparison with a coffee reconstituted from the starting extract.

EXAMPLE 2

10 kg of a spray-dried instant coffee powder with a moisture content of 2.5% are extruded using the equipment described above, the extruder being equipped with a single nozzle comprising 4 cylindrical orifices 3.5 mm in diameter.
The operating parameters are as follows:
temperature of extruder barrel: 100° C.
screw speed: 60 rpm
rotation speed of cutting blade: 370 rpm
pressure in the extrusion chamber: 40 mb
the grains are collected on a vibrating tray at ambient temperature.

Approximately 9.8 kg of brown-coloured coffee extract grains having the size of a small pea and an apparent density of 160 g/l are thus obtained. These grains dissolve almost instantaneously in cold water. A reconstituted instant coffee is prepared by dissolving these grains in hot water in a quantity of approximately 15 g per liter. According to a taste testing panel, reconstituted coffee has lost none of its organoleptic qualities by comparison with a coffee reconstituted from the starting extract.

EXAMPLE 3

10 kg of a spray-dried instant coffee powder with a moisture content of 2.7% are extruded using the equipment described above, the extruder being equipped with a single nozzle having 24 cylindrical orifices 3 mm in diameter.
The operating parameters are as follows:
temperature of extruder barrel: 100° C.
screw speed: 80 rpm
rotational speed of cutting blade: 250 rpm
pressure in the extrusion chamber: 45 mb
the grains are collected on a vibrating tray at ambient temperature.

Approximately 9.8 kg of brown-coloured coffee extract grains having the size of a small pea and an apparent density of 160 g/l are thus obtained. These grains are aromatised by the incorporation of 0.5% by weight of an emulsion containing one part of a condensate of volatile aromatic coffee constituents and 2 parts of coffee oil. Finally, the aromatised grains are packaged under an inert atmosphere in sealed containers.

When the containers are opened, the grains give off a pleasant odour of freshly roasted coffee. A reconstituted instant coffee is obtained by dissolving these grains in hot water in a quantity of approximately 15 g per liter, its quality being praised by the tasters.

EXAMPLE 4

10 kg of a spray-dried instant tea powder with a water content of 3% are extruded using the equipment described above, the extruder being equipped with a single nozzle having 6 cylindrical orifices 2.8 mm in diameter.
The operating parameters are as follows:
temperature of extruder barrel: 105° C.
screw speed: 40 rpm
rotational speed of cutting blade: 550 rpm
pressure in the extrusion chamber: 40 mb
the grains are collected on a vibrating tray at ambient temperature.

Approximately 9.8 kg of tea extract grains with the size of a small pea, a dark brown colour and an apparent density of 92 g/l are thus obtained. These grains dissolve almost instantaneously in cold water. A reconstituted instant tea is prepared by dissolving these grains in hot water in a quantity of approximately 3.5 g per liter. According to the taste testing panel, this reconstituted tea has lost none of its organoleptic qualities by comparison with a tea reconstituted from the starting extract.

EXAMPLES 5–8

Examples 5 to 8 were performed essentially in accordance with the procedure set forth in Example 1 except that the temperature of the extruder barrel was maintained at 86° C. while the pressure in the extrusion chamber was varied for each example to show the importance of having the proper chamber pressure to produce the product of the present invention, which is highly soluble in both hot and cold water. All of the remaining process parameters were kept constant for each of the examples.

TABLE

| Example # | Chamber Pressure | Properties of Coffee Grain Obtained |
|---|---|---|
| 5 | 1.0 bar | (atmospheric) regular shape and surface broken in majority dark dimensions of 1.5 to 3 mm more dense than water almost insoluble in cold water, even with stirring hardly soluble in hot water (80° C.), stirring recommended |
| 6 | 0.47 bar | regular shape and surface brown dimensions of 3 to 4 mm less dense than water hardly soluble in cold water, stirring recommended soluble in hot water (80° C.) |
| 7 | 0.28 bar | regular shape and surface light brown (like freeze dried coffee) dimensions of 4 to 5 mm less dense than water soluble in cold water, stirring optional very soluble in hot water (80° C.) |
| 8 | 0.05 bar | regular shape and surface light brown (like freeze dried coffee) dimensions of 5 to 6 mm less dense than water very soluble in cold water and hot water (a few seconds) |

As can be seen from the Table above, the threshold limit of the chamber pressure can be no greater than approximately 0.3 bar to obtain the product of the present invention. Maintaining a pressure greater than 0.3 bar produces a product which is not soluble in cold water.

We claim:

1. A water-soluble grain consisting of dehydrated extract of vegetable material selected from the group consisting of coffee, chicory, tea and herbal decoction, said grain having (a) a porous, cellular, internal structure encompassed by an essentially smooth surface skin, (b) an apparent density of from 50 to 300 g/l, (c) a moisture content of up to 6%; and (d) a resistance to crushing of between 2.5 and 7.5 Newtons.

2. The grain of claim 1, in which the dehydrated extract is of coffee or chicory and said grain has an apparent density of from 100 to 200 g/l.

3. The grain of claim 1, in which the dehydrated extract is of tea and said grain has an apparent density of from 80 to 150 g/l.

4. The grain of claim 1, in which said grain has a diameter of at least one mm.

5. The grain of claim 4, in which the grain has a diameter of from 2.5 to 15 mm.

6. The grain of claim 1, in which the internal porous structure is composed of cells having diameters of between 0.01 and 1 mm.

7. A process for producing a water-soluble grain having a resistance to crushing of between 2.5 and 7.5 Newtons consisting of pressure extruding a thermoplastic vegetable material extract selected from the group consisting of coffee, chicory, tea and herbal decoction having a moisture content of up to 10% by dry weight at a temperature in the range from about 60° to 125° C. and under a pressure of from about 1 to 10 atmospheres into a chamber where a subatmospheric pressure of from 0.01 to 0.3 atmosphere prevails, and then cutting the extruded product into fragments.

8. The process of claim 7, wherein the vegetable material extract is in the form of an aqueous paste.

9. The process of claim 7, wherein the vegetable material extract is a powder containing from 2 to 6% by weight of water.

10. The process of claim 7, wherein the chamber is maintained at a pressure of from about 0.05 to about 0.15 atmosphere.

11. The process of claim 7, wherein the thermoplastic vegetable material is extruded into the chamber through a nozzle having a diameter of at least 0.25 mm.

12. The process of claim 7, wherein the thermoplastic vegetable material is extruded into the chamber through a nozzle having a diameter of from 0.5 to 5 mm.

13. The process of claim 7, wherein the extruded product is cut after expansion.

14. The process of claim 7, wherein the extruded product is cut prior to complete expansion.

15. The process of claim 7, wherein the cut product is aromatized.

16. A process for the production of a vegetable extract grain having a resistance to crushing of between 2.5 and 7.5 Newtons selected from the group consisting of coffee, chicory, tea and herbal decoction which consists of extruding at a temperature in the range from about 60° to 125° C. and under a pressure of from about 1 to 10 atmospheres a thermoplastic vegetable material selected from the group consisting essentially of edible powder and paste and containing up to 10% water into a chamber where a subatmospheric pressure of from about 0.01 to 0.3 atmosphere prevails, and cutting the extruded product into fragments.

17. The process of claim 16, in which the product is aromatized.

* * * * *

UNITED STATES PATENT AND TRADEMARK OFFICE
CERTIFICATE OF CORRECTION

PATENT NO. : 4,154,864
DATED : May 15, 1979
INVENTOR(S) : Pierre Risler, Jean Gireau, Pierre Rose and Jean-Pierre Bisson It is certified that error appears in the above-identified patent and that said Letters Patent are hereby corrected as shown below:

At Col. 2, line 17, "50 to 300 g/l" should read -- 50 and 300 g/l --.

At Col. 3, line 14, "from" should read -- form --.

At Col. 3, line 17, "it" should read -- is --.

At Col. 4, line 3, "from" should read -- form --.

At Col. 4, line 65, "2 to 6%" should read -- 2 and 6% --.

At Col. 5, line 57, "notrogen" should read -- nitrogen --.

In the TABLE set forth at Col. 7, under the heading "Chamber Pressure" the first entry should read -- 1.0 bar (atmospheric) --. Under the heading "Properties of Coffee Grain Obtained", the first entry "(atmospheric) regular shape and" should read -- irregular shape and --.

Signed and Sealed this

Eleventh Day of September 1979

[SEAL]

Attest:

Attesting Officer

LUTRELLE F. PARKER
Acting Commissioner of Patents and Trademarks